Patented Apr. 9, 1929.

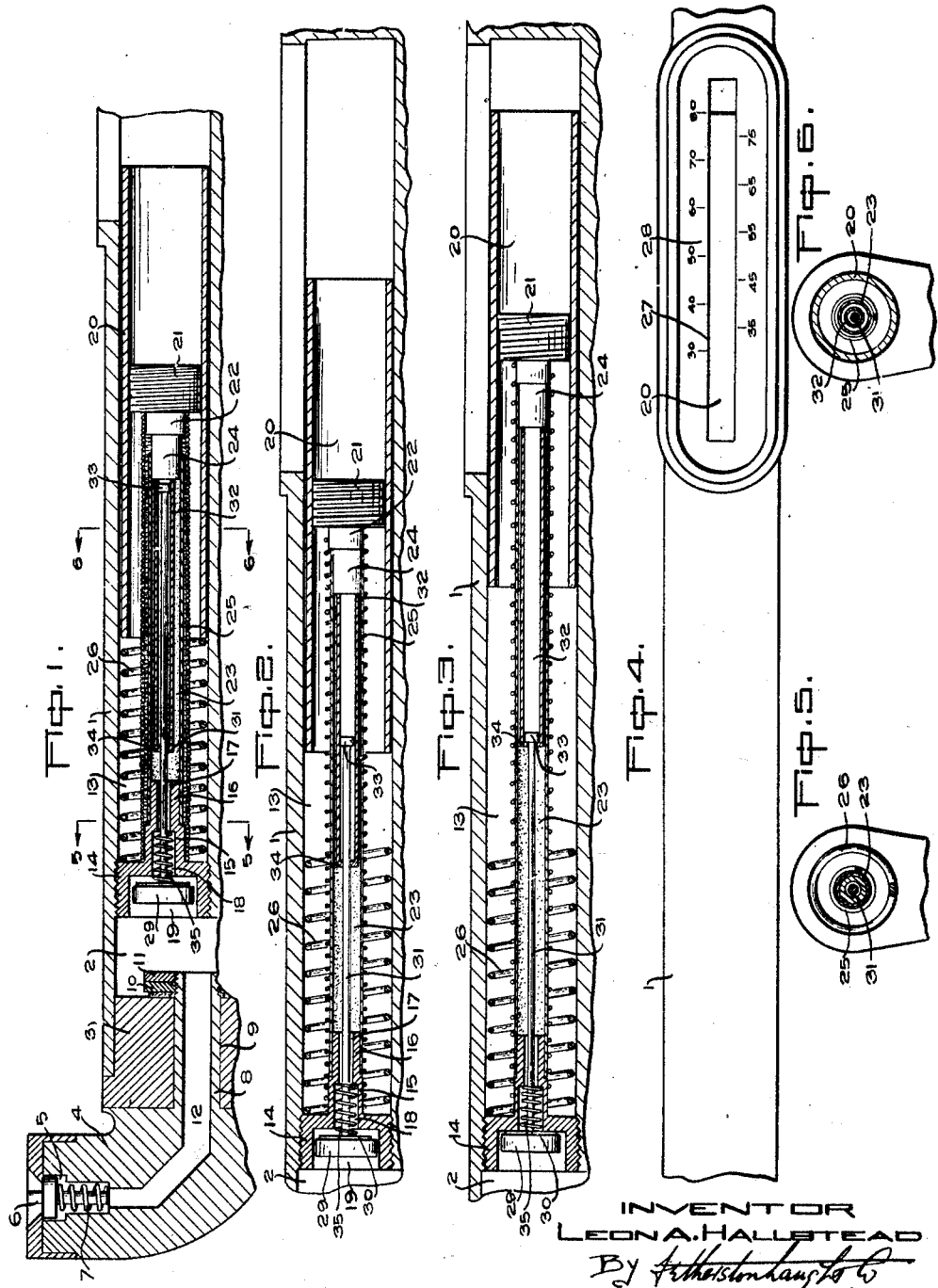

1,708,837

UNITED STATES PATENT OFFICE.

LEON ARTHUR HALLSTEAD, OF BUFFALO, NEW YORK, ASSIGNOR TO KORECT AIR METER CORPORATION, OF BUFFALO, NEW YORK, A CORPORATION OF NEW YORK.

AIR-PRESSURE GAUGE.

Application filed September 22, 1925. Serial No. 57,933.

My invention relates to improvements in air pressure gauges of the type shown in my patent application filed May 27, 1925, Serial Number 33,230, and the object of the invention is to construct a device which will accurately gauge the air pressure of low pressure balloon tires, and also of standard tires. A further object of the invention is to provide means for preventing excessive movement of the gauge with the consequent distortion of its mechanism when it is subjected to high air pressures as are used in pneumatic truck tires.

A still further object of the invention is to provide supplemental resilient means for assisting the movement of the gauge when low air pressures such as are used in balloon tires are being registered.

My invention consists of an air pressure gauge constructed and arranged all as hereinafter more particularly described and illustrated in the accompanying drawing in which:

Fig. 1 is a longitudinal, sectional view through a fragmentary portion of the gauge casing and nozzle showing a sectional view of the gauge therein in the inoperative position.

Fig. 2 is a similar view to Figure 1, the gauge nozzle not being shown, the air pressure gauge being shown in a registering position.

Fig. 3 is a similar view to Figure 2 showing the air pressure gauge at its highest registration point, the valve for admitting air thereto being closed.

Fig. 4 is a plan view of the gauge casing showing the graduated slot through which the movable sleeve of the gauge is visible.

Fig. 5 is a vertical cross sectional view through the line 5—5 Figure 1, and

Fig. 6 is a cross sectional view through the line 6—6 Figure 1.

Like characters of reference indicate corresponding parts in the different views.

1 is a portion of the gauge casing provided in its outer end with the circular recess or chamber 2, the outer end of which is adapted to receive the shouldered bushing 3 which is preferably threaded thereinto. 4 is the outer end of the rotatable nozzle which is turned over at right angles to the main portion and provided at its outer end with an orifice 5 adapted to receive the plunger 6 which is designed to open the automobile tire valve in the usual manner when the nozzle is applied thereto, the plunger 6 being resiliently held in position by means of the spiral spring 7. The rotatable portion 4 is provided on its inner end with a reduced portion 8 adapted to be inserted into the orifice 9 of the bushing 3 and held in engagement therewith by lock nuts 10 and 11 which are threaded onto the projecting end of the portion 8. 12 is a passage passing from the outer end of the nozzle to the recess 2.

A circular passage 13, opening into the recess 2 is provided in the casing 1 and adapted to receive the air pressure gauge which I shall now describe. The outer end of the passage 13 which communicates with the orifice 2 is threaded and receives a threaded bushing 14 which has a reduced shank 15 extending from its inner face which has a slightly reduced portion 16, and 17 is a passage-way extending through the reduced portion 16 opening into an enlarged passage-way 18 which extends through the shank 15, the outer end of the passage 18 entering a circular recess 19 provided in the face of the bushing 16. 20 is a sleeve of slightly smaller diameter than the passage 13 and adapted to slide therein, such sleeve being internally threaded and receiving the threaded plug 21 which has a reduced inner portion 22 of the same diameter as the reduced portion 15. The shank 16 on the bushing 14 is adapted to receive one end of a rubber sleeve 23, the other end of such sleeve being drawn over and sealed by a plug 24 the face of which abuts the face of the portion 22 on the plug 21.

25 is a spiral spring which constitutes a flexible, metallic covering for the rubber sleeve 23, its ends encircling and secured to the respective portions 15 and 22. 26 is a spiral spring of slightly less diameter than the passage-way 13 and adapted to encircle the spring covering 25 of the rubber sleeve 23, being inserted between the inner face of the bushing 14 and the sleeve 20, the end of the spring being attached to the bushing. 27 is a longitudinal slot in one end of the passage 13 through which the sleeve 20 can be seen, and 28 is a graduated scale on the face of the casing in proximity to the slot.

A valve 29 having a contact face 30 of rubber or like material is positioned within the recess 19 in the face of the bushing 14 and is provided with a centrally positioned valve stem 31 which extends inwardly through the passageways 18 and 17 into the rubber sleeve 23 almost extending to the inner face of the plug 24 when the valve is in the inoperative position. 32 is a tube secured to the inner face of the plug 24 surrounding the valve rod 31 and extending forwardly in the sleeve 23 into proximity with the inner face of the portion 17 when the valve is in the inoperative position. The free end of the valve stem 31 is provided with an enlarged head 33 which is secured thereto and adapted to come in contact with the turned in end 34 of the tube 32 when the valve is extended to its limit as illustrated in Figure 3. 35 is a spiral spring encircling the valve stem 31 and inserted into the passage-way 18 extending between the face 30 of the valve and the shoulder constituted at the juncture of the passage-way 18 and the entrance to the reduced passage-way 17, such spring being normally adapted to keep the valve normally open to permit air entering the gauge.

The operation of my device is as follows:

When the nozzle portion 4 is applied to the tire valve (not shown) the air pressure from the source of air supply enters the recess or chamber 2, then through the passage 12, and orifice 5 to the tire valve. When such air pressure is shut off externally of the device by means of a control valve (not shown as it forms no part of the present invention) and assuming that the nozzle portion 4 is still applied to the tire valve with the plunger 6 depressing the tire valve stem the air in the tire will flow back through the orifice 5, passage 12, recess 2, recess 19, passages 18 and 17 into the rubber sleeve 23, through the tube 32 and impinges on the face of the plug 24, causing the elongation of such sleeve 23 with a consequent movement of the sleeve 20 and the air pressure in the tire is read by observing the relative position of the end of the sleeve 20 with respect to the graduations on the scale 28.

The above applies in toto where the device is attached to a source of air supply, but where it is used solely as a gauge the recess 2 would have no inlet for the admission of air from the source of air supply but the device in so far as indicating tire air pressure would function as stated above.

When the gauge is in the inoperative position as the spiral spring 26 is slightly weaker than the spring covering 25 of the rubber sleeve 23 it will be held in slight compression between the inner face of the bushing 14 and the sleeve 20, the end of the sleeve 20 registering zero on the scale 28. When air is admitted to the gauge under low pressure as used in balloon tires it will be appreciated that the air pressure alone would not be sufficient to elongate the rubber sleeve 23 and spring 25 and move the sleeve 20 a sufficient distance to register the correct air pressure admitted to the gauge on the scale 28. The provision of the spring 26 which acts in the capacity of a booster spring prevents any possibility of an inaccurate reading being given as it assists the air pressure in moving the sleeve 20 to the correct reading position. When the gauge is used in determining the greater air pressure in standard tires the air pressure will be sufficient in itself to elongate the rubber sleeve 23 and spring 25 and move the sleeve 20 to the correct reading position. It will be seen in this case that as the sleeve 20 moves along the passage 13 that the spiral spring 26 will reach its maximum expansion and become inoperative, whereupon any further movement of the sleeve 20 causes it to move out of engagement with the spring 26, this further movement depending, of course, entirely upon the air pressure in the rubber sleeve 23.

It has been found that in using gauges of the standard type in conjunction with air line nozzles that they are apt to become distorted and inaccurate when the nozzle is used for inflating truck tires which carry a high air pressure as such air pressure would enter the gauge subjecting it to a strain and actuating it beyond the limit of its movement. For eliminating this occurrence and preventing undue strains upon my gauge I provide the valve 29 which is operated in the following manner and cuts off the entry of air into the gauge when a sufficient, predetermined pressure has been reached. As the rubber sleeve 23 is elongated under the influence of the air pressure the plug 24 in its end will move rearwardly carrying with it the tube 32 which is secured to its inner face, the headed valve stem 31 sliding in the tube. When the sleeve 23 reaches its predetermined limit of expansion it will be seen that the head 33 on the valve stem 31 will come in contact with the turned in portion 34 on the outer end of the tube 32 and the valve stem 31 will be drawn rearwardly compressing the spring 35 under the influence of the forward movement of the tube, bringing the face 20 of the valve 29 into contact with the inner face of the recess 19 and cutting off any further admittance of air into the gauge. When the nozzle is removed from the tire valve the air pressure in the passage-way 12 and recess 2 will, of course, immediately drop with the consequent reduction of pressure upon the face of the valve 29 which will permit it to move outwardly under the influence of the springs 35 and 31 against the air pressure in the sleeve, the air exhausting from the sleeve 23 and the gauge returning to its normal inoperative position as shown in Figure 1.

From the above description of my device it will be apparent that I have constructed an air pressure gauge which will accurately record air pressures in either balloon or standard tires. Furthermore I have provided means for preventing the distortion of the gauge when high air pressures are admitted thereto.

My gauge is particularly applicable for use in air line nozzles at automobile service stations where motorists expect to ascertain the correct air pressure in their tires irrespective of whether they are of the standard or balloon type and in which it is also permissible to use a nozzle in which my gauge is incorporated for inflating truck tires to a high air pressure.

What I claim as my invention is:—

1. A fluid pressure gauge comprising a casing, fluid pressure indicating means movable in the casing under the influence of the fluid pressure, and independent means in the casing acting in conjunction with the fluid pressure for engaging and actuating the fluid pressure indicating means in the initial part of its movement.

2. A fluid pressure gauge comprising a casing, fluid pressure indicating means movable in the casing under the influence of the fluid pressure, independent means in the casing acting in conjunction with the fluid pressure for engaging and actuating the fluid indicating means in the initial part of its movement when low pressures are being registered, and means whereby the fluid pressure indicating means moves out of engagement from the independent means and is solely actuated by the fluid pressure during the latter part of its movement when higher fluid pressures are being registered.

3. A fluid pressure gauge comprising a casing, fluid pressure indicating means movable in the casing under the influence of the fluid pressure, and independent resilient means in the casing acting in conjunction with the fluid pressure for engaging and actuating the fluid pressure indicating means.

4. A fluid pressure gauge comprising a casing, fluid pressure indicating means movable in the casing under the influence of the fluid pressure, resilient means in the casing engaging the fluid pressure indicating means and tending to retain it in its non-indicating position, and a second resilient means engaging the fluid pressure indicating means and adapted in conjunction with the fluid pressure to overcome the resistance to movement of the fluid pressure indicating means under the influence of the first-mentioned resilient retaining means.

5. A fluid pressure gauge comprising a casing, fluid pressure indicating means movable in the casing under the influence of the fluid pressure, an expandible chamber into which the fluid pressure is admitted to actuate the fluid pressure indicating means and means actuated by the movement of the expandible chamber for cutting off the further admittance of fluid thereinto when said chamber has reached a predetermined expansion point.

6. A fluid pressure gauge comprising a casing, fluid pressure indicating means movable in the casing under the influence of the fluid pressure, a receptacle into which the fluid pressure is admitted to actuate the fluid pressure indicating means, resilient means for controlling the movement of the fluid pressure indicating means under the influence of the fluid pressure, and means actuated by the fluid pressure for cutting off the further admittance of fluid to the receptacle for limiting the movement of the fluid pressure indicating means when a predetermined pressure is recorded.

7. A fluid pressure gauge comprising a casing, fluid pressure indicating means movable in the casing under the influence of the fluid pressure, an expandible fluid receiving receptacle in the casing adapted to engage and actuate the fluid pressure indicating means, a valve for controlling the admittance of fluid to the expandible receptacle, and means whereby the expansion of the receptacle closes the valve when the fluid pressure has expanded the receptacle a predetermined degree.

8. A fluid pressure gauge comprising a casing, fluid pressure indicating means movable in the casing under the influence of the fluid pressure, independent resilient means in the casing engaging the fluid pressure indicating means and tending to retain it in its non-indicating position, an expandible fluid pressure receiving receptacle adapted to engage and actuate the fluid pressure indicating means, a valve for controlling the admittance of fluid to the expandible receptacle and means for closing the valve when the fluid pressure indicating means has reached the limit of a predetermined movement.

9. A fluid pressure gauge comprising a casing, fluid pressure indicating means movable in the casing under the influence of the fluid pressure, a receptacle into which fluid is admitted to actuate the fluid pressure indicating means, a spring in the casing for engaging and tending to actuate the fluid pressure indicating means, a second spring in the casing tending to retain the fluid pressure indicating means in its non-indicating position, the second spring being adapted to exert a greater pressure upon the fluid pressure indicating means than the first-mentioned spring so that the fluid pressure indicating means remains in its non-indicating means when only under the influence of the two springs and means whereby fluid pressure is admitted to the fluid receiving receptacle and assists the first-mentioned spring in overcoming the resistance of the second-mentioned spring and moving the fluid pressure indicating means to a position indicating the pressure of fluid admitted to the receptacle.

10. A fluid pressure gauge comprising a casing, fluid pressure indicating means movable in the casing under the influence of the fluid pressure, an expandible fluid receiving chamber in the casing into which fluid is admitted, the expansion of such chamber actuating the fluid pressure indicating means, resilient means for keeping the expandible chamber in its non-expanded position, and the fluid pressure indicating means in its non-indicating position, contracted resilient means tending to actuate the fluid pressure indicating means, and means whereby fluid is admitted to the expandible chamber whereby the chamber is expanded and the fluid pressure indicating means actuated so that it is moved out of engagement with the contracted resilient means when the limit of expansion of such resilient means is reached.

LEON ARTHUR HALLSTEAD.